US007895601B2

United States Patent
Benner et al.

(10) Patent No.: US 7,895,601 B2
(45) Date of Patent: Feb. 22, 2011

(54) COLLECTIVE SEND OPERATIONS ON A SYSTEM AREA NETWORK

(75) Inventors: Alan F. Benner, Poughkeepsie, NY (US); Michael A. Ko, San Jose, CA (US); Gregory F. Pfister, Austin, TX (US); Renato J. Recio, Austin, TX (US); Jacobo A. Vargas, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 11/621,752

(22) Filed: Jan. 10, 2007

(65) Prior Publication Data

US 2008/0168471 A1    Jul. 10, 2008

(51) Int. Cl.
    *G06F 15/163* (2006.01)
(52) U.S. Cl. ...................................... 719/314
(58) Field of Classification Search .................. 719/314
    See application file for complete search history.

(56) References Cited

U.S. PATENT DOCUMENTS

| 6,834,332 B2 | 12/2004 | Craddock et al. | |
|---|---|---|---|
| 2002/0159456 A1 | 10/2002 | Foster et al. | |
| 2003/0005068 A1* | 1/2003 | Nickel et al. ................. | 709/208 |
| 2003/0033426 A1 | 2/2003 | Beukema et al. | |
| 2005/0080869 A1 | 4/2005 | Bender et al. | |
| 2005/0144313 A1* | 6/2005 | Arndt et al. .................. | 709/238 |
| 2006/0045099 A1 | 3/2006 | Chang et al. | |
| 2007/0208820 A1* | 9/2007 | Makhervaks et al. ........ | 709/212 |
| 2008/0155107 A1* | 6/2008 | Kashyap ...................... | 709/228 |

OTHER PUBLICATIONS

Kini, Sushmitha P., "Efficient Collective Communication using RDMA and Multicast Operations for InfiniBand-Based Clusters," Ohio State University (2003). [retrieved from http://nowlab.cse.ohio-state.edu/NOW/msthesis/sushmita_thesis.pdf on Apr. 21, 2010].*

(Continued)

*Primary Examiner*—Hyung S Sough
*Assistant Examiner*—Brian Wathen
(74) *Attorney, Agent, or Firm*—Stephen J. Walder, Jr.; Matthew B. Talpis

(57) ABSTRACT

Mechanisms for collective send operations on a system area network are provided. The mechanisms of the illustrative embodiments provide for the creation, modification, and removal of collective send queues (CSQs) that allow the upper level protocol (ULP) used by a consumer to send the same message to a collective set of queue pairs (QPs). In order to use the transport services of a CSQ, a consumer process posts a write work request (WR) to the CSQ. The write WR causes a write work queue element (WQE) to be generated and placed in the CSQ. A channel interface (CI) is provided that effectively copies the write WQE to all of the send queues (SQs) of the QPs in the QP set associated with the CSQ. When all the QPs complete processing of their respective write WQEs, the HCA releases all data segments referenced by the write WR.

20 Claims, 12 Drawing Sheets

OTHER PUBLICATIONS

Sur et al., "High Performance RDMA Based All-to-all Broadcast for InfiniBand Clusters", Proceedings of the 12$^{th}$ Intl'l. Conf. on High Performance Computing (HiPC 2005), 2005, http://nowlab.cse.ohio-state.edu/publications/conf-papers/2005/surs-hipc05.pdf, pp. 148-157.

Gupta et al., "Efficient Collective Operations using Remote Memory Operations on VIA-Based Clusters", Proceedings of Int'l. Parallel Distributed Processing Symposium, 2003, http://citeseer.ist.psu.edu/cache/papers/cs/29902/ftp:zSzzSzftp.cis.ohio-state.eduzSzpubzcommunicationzSzpaperszSzipds03-rdmacoll.pdf/gupta03efficient.pdf, pp. 1-9.

Ho et al., "Modeling of Replicate-At-Send multicasting in shared-money ATM switches", Globecom '00, IEEE Global Telecommunications Conference, 2000, http://www.it.iitb.ac.in/~it612/resources/repository/GLOBECOM00/vol1/Modeling_of_replicate_at_send_pdf, pp. 505-509.

Torsten Hofler, "Evaluation of publicly available Barrier-Algorithms and Improvement of the Barrier-Operations for large-scale Cluster-Systems with special Attention on InfiniBand™ Networks", Diploma Thesis, Chemnitz University of Technology, Mar. 29, 2005, http://archiv.tu-chemnitz.de/pub/2005/0073/data/diploma.pdf, 91 pages.

* cited by examiner

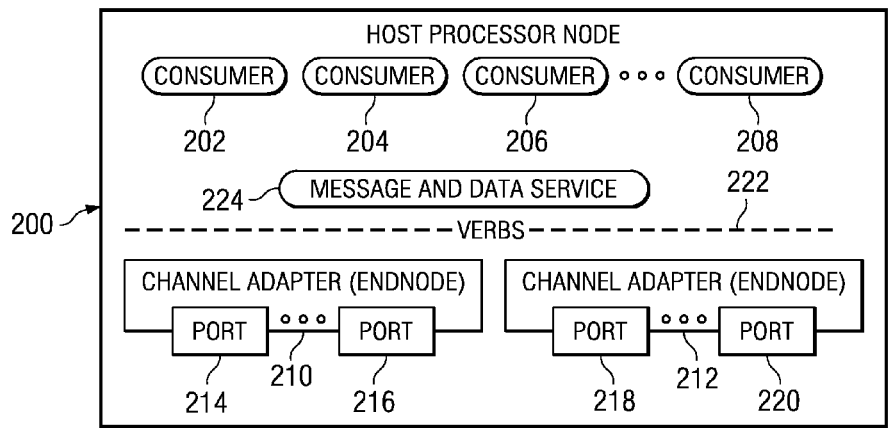
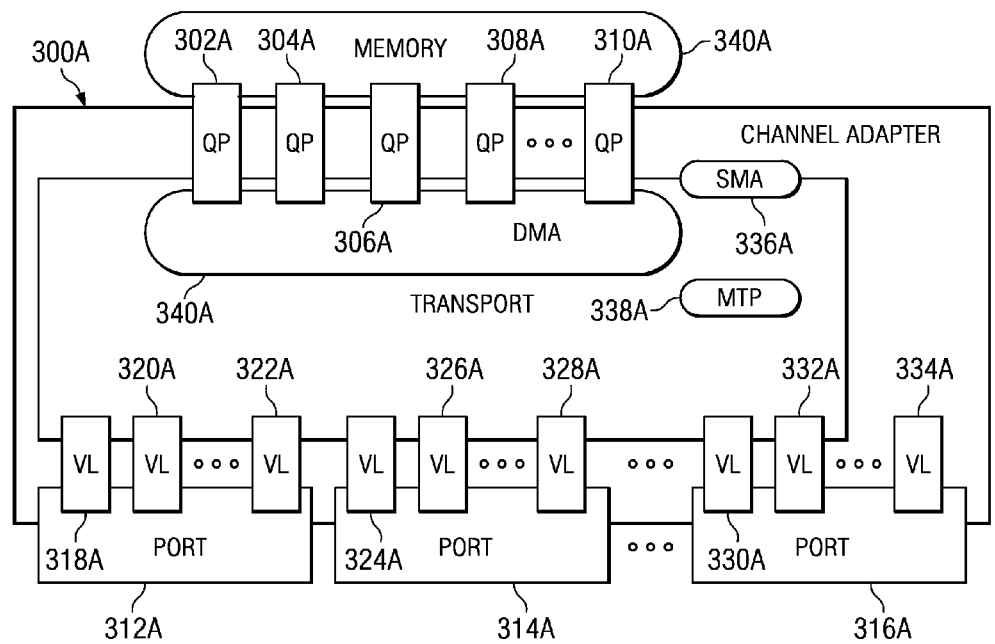

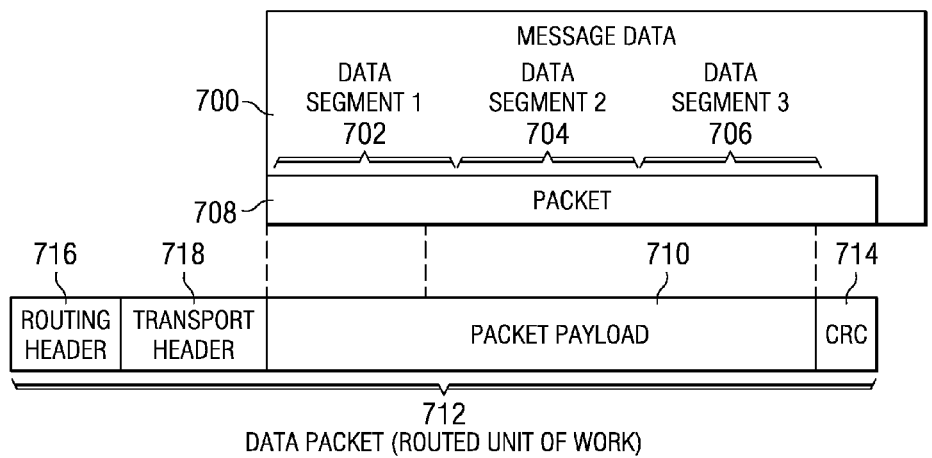
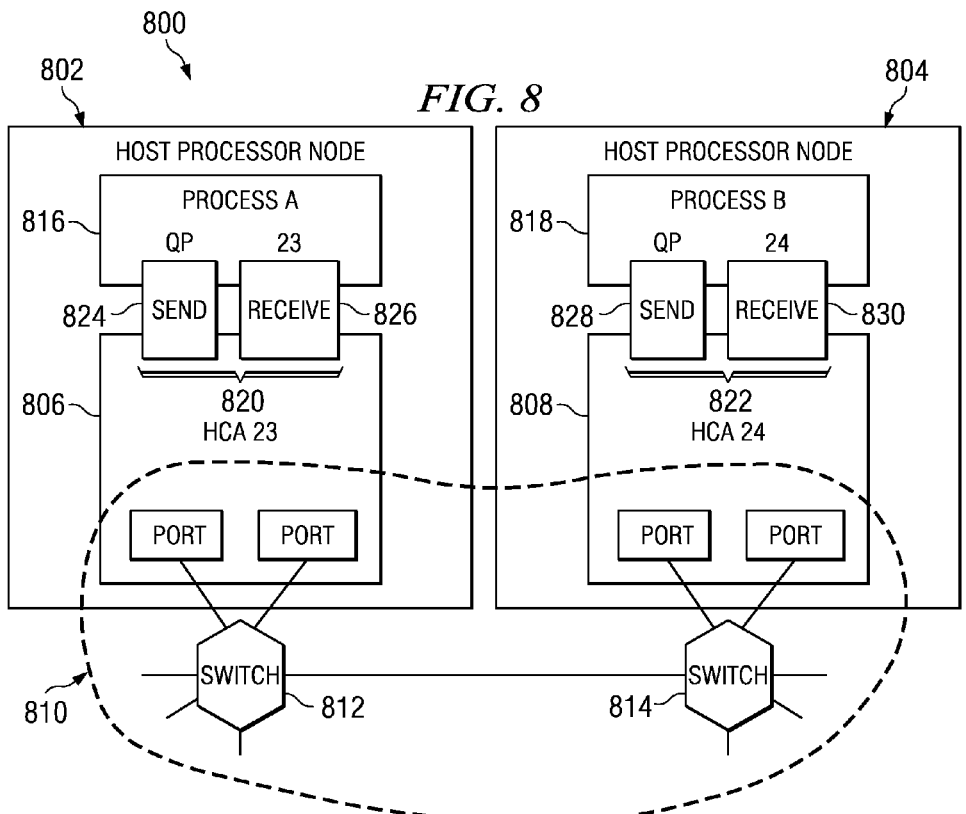

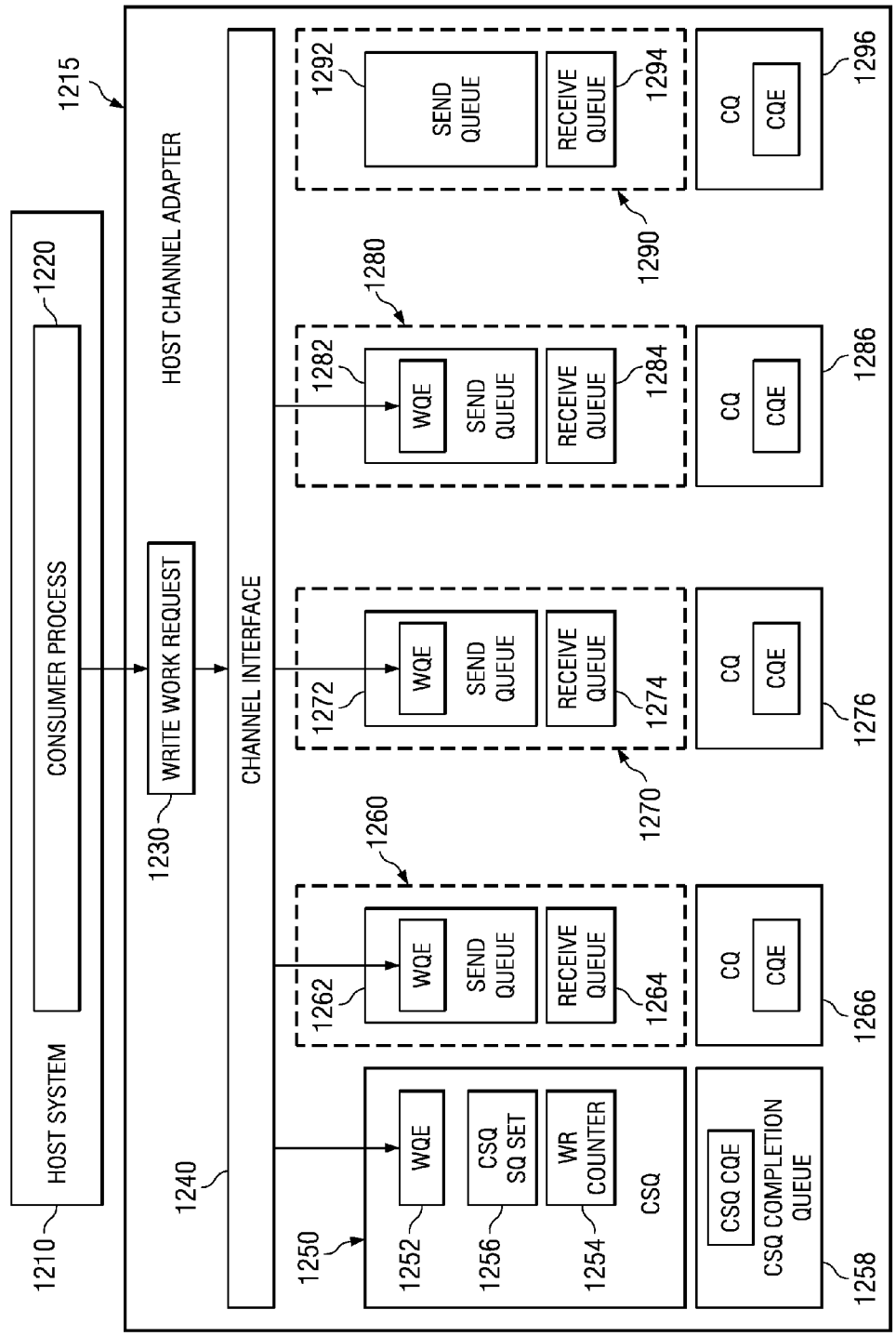

US 7,895,601 B2

COLLECTIVE SEND OPERATIONS ON A SYSTEM AREA NETWORK

BACKGROUND

1. Technical Field

The present application relates generally to an improved data processing system and method. More specifically, the present application is directed to a system and method for performing collective send operations on a system area network.

2. Description of Related Art

In a System Area Network (SAN), such as an InfiniBand™ (IB) network or iWarp network, hardware provides a message passing mechanism that can be used for Input/Output devices (I/O) and inter-processor communications (IPC) between general computing nodes. Processes executing on devices access SAN message passing hardware by posting send/receive messages to send/receive work queues on a SAN channel adapter (CA). These processes also are referred to as "consumers."

The send/receive work queues (WQ) are assigned to a consumer as a queue pair (QP). The messages can be sent over different transport types, which for an iWARP network may consist of a Transport Control Protocol/Internet Protocol (TCP/IP) transport type, and over an IB network, may consist of Reliable Connected (RC), Reliable Datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

For IB networks, two channel adapter types are present in nodes of the SAN fabric, a host channel adapter (HCA) and a target channel adapter (TCA). The HCA is used by general purpose computing nodes to access the SAN fabric. For iWARP, RDMA enabled NICs (RNICS) are present in the nodes of the SAN fabric and used to access the SAN fabric. Consumers use SAN "verbs" to access host channel adapter functions. The software that interprets verbs and directly accesses the channel adapter is known as the channel interface (CI).

Target channel adapters (TCA) are used by nodes that are the subject of messages sent from host channel adapters. The TCAs serve a similar function as that of the HCAs in providing the target node an access point to the SAN fabric. More information about SANs and the InfiniBand™ architecture may be obtained from the specification documents available from the InfiniBand™ Trade Association at www.infinibandta.org/specs/. More information about iWarp may be found at: the RDMA Consortium's home page at http://www.rdmaconsortium.org/home and the IETF's Transport Area's Remote Direct Data Placement Working Group home page at http://www.ietf.org/html.charters/rddp-charter.html.

To satisfy the requirement of high performance computing (HPC) application to be able to perform send operations to a collection of end-points, known SAN architectures, such as the InfiniBand™ architecture, provide three different transport services to handle send operations. The first transport service is the Reliable Connection (RC). This transport service requires the creation of a queue pair (QP) for each end-point and the consumer process must post a write work request (WR) for each end-point, i.e. on each QP. This method, while reliable, is not efficient as one WR and one QP has to be generated for each end-point.

Another transport service available under known SAN architectures, such as InfiniBand™ is a reliable datagram (RD). In the RD transport service, a single QP may communicate with multiple end-points. This is made possible through the end-to-end context (EEC) mechanism provided by the RD transport service described previously. A consumer may post work requests to a RD QP that target any of the EECs on the same host channel adapter (HCA) as the RD QP. While this transport service may eliminate the requirement that there be a separate QP for each end-point, this transport service is inefficient because the consumer process must post a WR for each end-point. Additionally, the RD service only allows one message to be outstanding on a link. This inability to pipeline work causes poor performance. Moreover, if the end-point has multiple QPs that need to receive the message that is the subject of the WR, then a Send WR must be posted to the HCA's RD QP for each QP of each end-point that is to receive the message.

While this transport service may eliminate the requirement that there be a separate QP for each end-point, this transport service is inefficient because the consumer process must post a WR for each end-point. Moreover, if the end-point has multiple QPs that need to receive the message that is the subject of the WR, then a WR must be posted to the HCA's RD QP for each QP of each end-point that is to receive the message.

The third transport service is the unreliable datagram (UD). The UD transport service is connectionless and unacknowledged. It allows the QP to communicate with any UD QP on any node. Using this service, consumer processes may multicast a message by posting one WR. However, there is no guarantee that the message will reach any or all the end-points.

SUMMARY

In view of the above, it would be beneficial to have a reliable and efficient transport service that allows for collective message sends to a set of queue pairs. The illustrative embodiments described herein provide such a mechanism. The mechanisms of the illustrative embodiments provide for the creation, modification, and removal of collective send queues (CSQs) that allow the upper level protocol (ULP) used by a consumer to send the same message to a collective set of queue pairs (QPs).

With the illustrative embodiments, a Create CSQ operation is provided for instantiating a CSQ and associating the CSQ with an initial set of QPs. A Modify CSQ operation is also provided that allows for the addition or deletion of QPs from the QP set. A Destroy CSQ operation is further provided for removing a CSQ.

In order to use the transport services of a CSQ, a consumer process posts a write work request (WR) to the CSQ. This write WR may be either signaled or unsignaled and references the same data segments for all of the QPs in the QP set. A signaled write WR causes a work completion (WC) counter value to be returned to the consumer process with each work completion, as discussed hereafter. An unsignaled write WR means that the WC counter value is not returned with each work completion.

The write WR causes a write work queue element (WQE) to be generated and placed in the CSQ. A channel interface (CI) is provided that effectively copies the write WQE to all of the send queues (SQs) of the QPs in the QP set associated with the CSQ. The host channel adapter (HCA) processes each write WR in the order it was placed on the CSQ. Moreover, for a given SQ, the HCA also processes each write WQE in the order it was placed on that SQ. When all the QPs complete processing of their respective write WQEs, the HCA will release all data segments referenced by the write WR.

In order to determine when all of the write WQEs have completed processing in their respective send queues, a WR counter state in the CSQ may be provided for each posted write WR that has not completed yet. When the CSQ processes a WQE corresponding to the write WR, the HCA sets a work completion (WC) counter to the number of QPs in the collective QP set associated with the CSQ. Each time a send queue completes processing of its associated WQE, the HCA decrements the WC counter value by 1. If the consumer process selected a signaled write WR, then the WC counter value may be returned with each completed processing of a WQE. When the WC counter value reaches zero, the WQE corresponding to the write WR is deleted from the CSQ. If the transfer of a WR posted through the CSQ completes in error on an associated QP, the WC associated with the message transfer indicates that the message completed in error and the QP is placed in the error state.

In one illustrative embodiment, a method for performing collective send operations is provided. The method may comprise creating a collective send queue data structure, the collective send queue data structure having one or more associated queue pairs for communicating with one or more endpoint devices. The method may further comprise receiving a single work request, from a consumer process running in the data processing system, specifying a collective send operation and posting a queue element corresponding to the work request in the collective send queue data structure. Moreover, the method may comprise automatically replicating the queue element in send queues of the one or more queue pairs associated with the collective send queue data structure. The send queues may process the replicated queue element to thereby perform the collective send operation.

The method may also comprise creating a work request counter and modifying a value of the work request counter in response to receiving completion notifications from the one or more queue pairs associated with the collective send queue data structure. The work request counter value may be initially set to a value corresponding to a number of queue pairs associated with the collective send queue data structure. Modifying the value of the work request counter may comprise decrementing the work request counter value in response to receiving a completion notification from the one or more queue pairs associated with the collective send queue data structure. When the work request counter value equals zero, a work request completion message may be posted to a completion queue.

The work request counter value may be initially set to zero. Modifying a value of the work request counter may comprise incrementing the work request counter value in response to receiving completion notifications from the one or more queue pairs associated with the collective send queue data structure. When the work request counter value equals a number of queue pairs associated with the collective send queue data structure, a work request completion message is posted to a completion queue. When the work request value equals zero, the collective send queue (CSQ) is destroyed, and wherein the CSQ is destroyed by a privileged consumer process invoking a Destroy CSQ interface operation of a channel interface implemented by a hardware channel adapter.

The method may be implemented by a channel interface of a channel adapter. The method may be implemented in a hardware adapter associated with a host node in a system area network.

The collective send queue (CSQ) may be created by a privileged consumer process invoking a Create CSQ interface operation of a channel interface implemented by a hardware channel adapter. The one or more queue pairs associated with the collective send queue (CSQ) may be associated with the CSQ by a privileged consumer process invoking a Modify CSQ interface operation of a channel interface implemented by a hardware channel adapter to thereby add a queue pair to a queue pair list data structure associated with the CSQ.

The method may further comprise generating a work request bit map, wherein the work request bit map has a bit associated with each of the one or more queue pairs associated with the collective send queue. The method may also comprise monitoring one or more completion queues associated with the one or more queue pairs for completion queue elements associated with the replicated queue elements. Moreover, the method may comprise setting bits in the work request bit map in response to posting of completion queue elements to the one or more completion queues. The method may also determining if all of the bits in the work request bit map are set and posting a work request completion message to a completion queue in response to all of the bits in the work request bit map being set.

The method may comprise determining if a timeout condition associated with the single work request occurs and returning an error message containing the work request bit map to the consumer process in response to the timeout condition occurring. The method may further comprise determining which endpoints were not able to process the replicated queue elements corresponding to the single work request based on bit settings in the work request bit map.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a host node and a channel adapter coupled to the host node. The channel adapter may perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is an exemplary block diagram of a host processor node in which exemplary aspects of the illustrative embodiments may be implemented;

FIG. 3A is an exemplary diagram of a host channel adapter in accordance with one illustrative embodiment;

FIG. 7 is an exemplary diagram of a data packet in accordance with one illustrative embodiment;

FIG. 8 is an exemplary diagram illustrating a portion of a distributed computer system for illustrating an example request and acknowledgment transaction in accordance with one illustrative embodiment;

FIG. 12 is an exemplary diagram illustrating a collective send operation mechanism in accordance with one illustrative embodiment;

DETAILED DESCRIPTION OF THE ILLUSTRATIVE EMBODIMENTS

The illustrative embodiments provide a mechanism for performing collective send operations on a system area network (SAN). While the illustrative embodiments are described herein with regard to the InfiniBand™ and iWARP architectures, it should be appreciated that the mechanisms of the illustrative embodiments may be used with any cluster network or SAN that implements queues for inter-node and/or inter-process communication, as discussed hereafter. Thus, the present invention is not limited to InfiniBand™ or iWARP based cluster network or SAN.

In order to provide a context in which the mechanisms of the illustrative embodiments may be understood, FIGS. 1-8 are provided hereafter for describing the various components and operations of a SAN in which the illustrative embodiments may be implemented. FIGS. 1-8 are only exemplary and are not intended to state or imply any limitation with regard to the types of SANs in which the illustrative embodiments may be implemented. To the contrary, the mechanisms of the illustrative embodiments may be implemented in any San that uses queues for communication.

Figure 1:
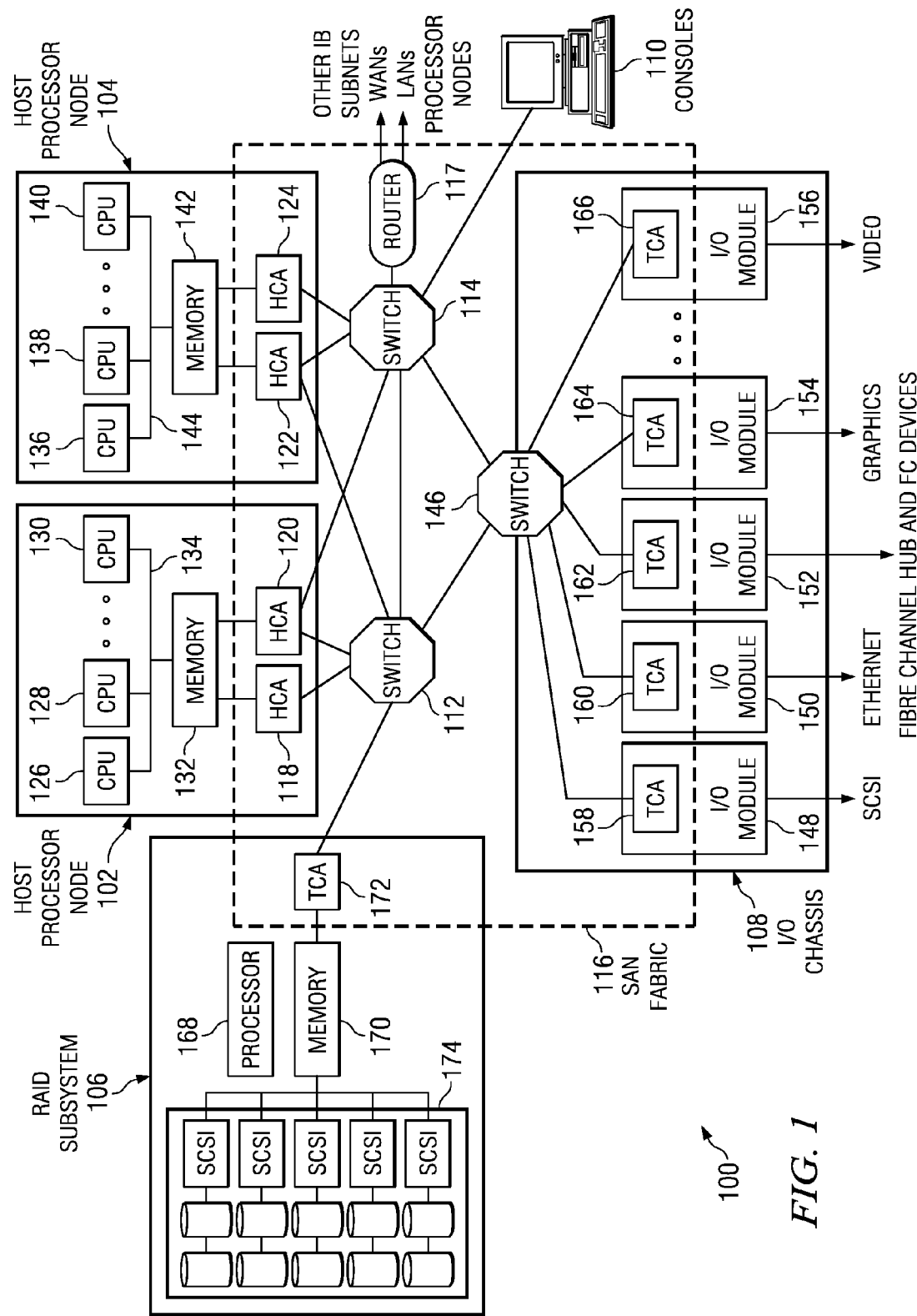
FIG. 1 is an exemplary diagram of a distributed computer system in which exemplary aspects of the illustrative embodiments may be implemented.

With reference now to the figures and in particular with reference to FIG. 1, a diagram of a distributed computer system is illustrated in accordance with one illustrative embodiment. The distributed computer system represented in FIG. 1 takes the form of a system area network (SAN) 100 and is provided merely for illustrative purposes, and the illustrative embodiments described below may be implemented on computer systems of numerous other types and configurations. For example, computer systems implementing the illustrative embodiments may range from a small server with one processor and a few input/output (I/O) adapters to massively parallel supercomputer systems with hundreds or thousands of processors and thousands of I/O adapters. Furthermore, the illustrative embodiments may be implemented in an infrastructure of remote computer systems connected by an internet or intranet. Additionally, the illustrative embodiments may consist of servers only with no I/O adapters and this type of fabric may also be called a cluster or local area network.

The SAN 100 is a high-bandwidth, low-latency network interconnecting nodes within the distributed computer system. A node is any component attached to one or more links of a network and forming the origin and/or destination of messages within the network. In the depicted example, the SAN 100 includes nodes in the form of host processor node 102, host processor node 104, redundant array independent disk (RAID) subsystem node 106, and I/O chassis node 108. The nodes illustrated in FIG. 1 are for illustrative purposes only, as the SAN 100 may connect any number and any type of independent processor nodes, I/O adapter nodes, and I/O device nodes. Any one of the nodes may function as an endnode, which is herein defined to be a device that originates or finally consumes messages or frames in the SAN 100.

A message, as the term is used herein, is an application-defined unit of data exchange, which is a primitive unit of communication between cooperating processes. A packet, or frame, is one unit of data encapsulated by networking protocol headers and/or trailers. The headers generally provide control and routing information for directing the packet/frame through the SAN 100. The trailer generally contains control and cyclic redundancy check (CRC) data for ensuring packets/frames are not delivered with corrupted contents.

The SAN 100 contains the communications and management infrastructure supporting both I/O and inter-processor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes may communicate over multiple ports and utilize multiple paths through the SAN fabric. The multiple ports and paths through the SAN 100 shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets/frames from one link to another link within a subnet using a small header Destination Local Identifier (DLID) field. A router is a device that connects multiple subnets together and is capable of routing packets/frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface, or simply "channel interface," in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126-130 and a memory 132 interconnected by bus system 134. Host processor node 104 similarly includes central processing units 136-140 and a memory 142 interconnected by a bus system 144.

Host channel adapters 118 and 120 provide a connection to switch 112 while host channel adapters 122 and 124 provide a connection to switches 112 and 114. In one embodiment, a host channel adapter is implemented in hardware, In this implementation, the host channel adapter hardware offloads much of central processing unit and I/O adapter communication overhead. This hardware implementation of the host channel adapter also permits multiple concurrent communications over a switched network without the traditional overhead associated with communication protocols.

In one embodiment, the host channel adapters and the SAN 100 in FIG. 1 provide the I/O and inter-processor communications (IPC) consumers of the distributed computer system with zero processor-copy data transfers without involving the operating system kernel process. Moreover, the host channel adapters and the SAN 100 employ hardware to provide reliable, fault tolerant communications.

As indicated in FIG. 1, router 116 is coupled to wide area network (WAN) and/or local area network (LAN) connections to other hosts or other routers. The I/O chassis 108 in FIG. 1 includes an I/O switch 146 and multiple I/O modules 148-156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158-166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

The SAN 100 handles data communications for I/O and inter-processor communications. SAN 100 supports high-bandwidth and scalability required for I/O and also supports the extremely low latency and low CPU overhead required for inter-processor communications. User clients can bypass the operating system kernel process and directly access network communication hardware, such as host channel adapters, which enable efficient message passing protocols. The SAN 100 is suited to current computing models and is a building block for new forms of I/O and computer cluster communication. Further, SAN 100 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and inter-processor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Turning next to FIG. 2, a functional block diagram of a host processor node is depicted in accordance with one illustrative embodiment. Host processor node 200 is an example of a host processor node, such as host processor node 102 in FIG. 1.

In this example, host processor node 200 shown in FIG. 2 includes a set of consumers 202-208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202-208 to process messages and other data.

With reference now to FIG. 3A, a diagram of a host channel adapter is depicted in accordance with one illustrative embodiment. Host channel adapter 300A shown in FIG. 3A includes a set of queue pairs (QPs) 302A-310A, which are used to transfer messages to the host channel adapter ports 312A-316A. Buffering of data to host channel adapter ports 312A-316A is channeled through virtual lanes (VL) 318A-334A where each VL has its own flow control. Subnet manager configures channel adapters with the local addresses for each physical port, i.e., the port's LID.

Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302A-310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 3B:
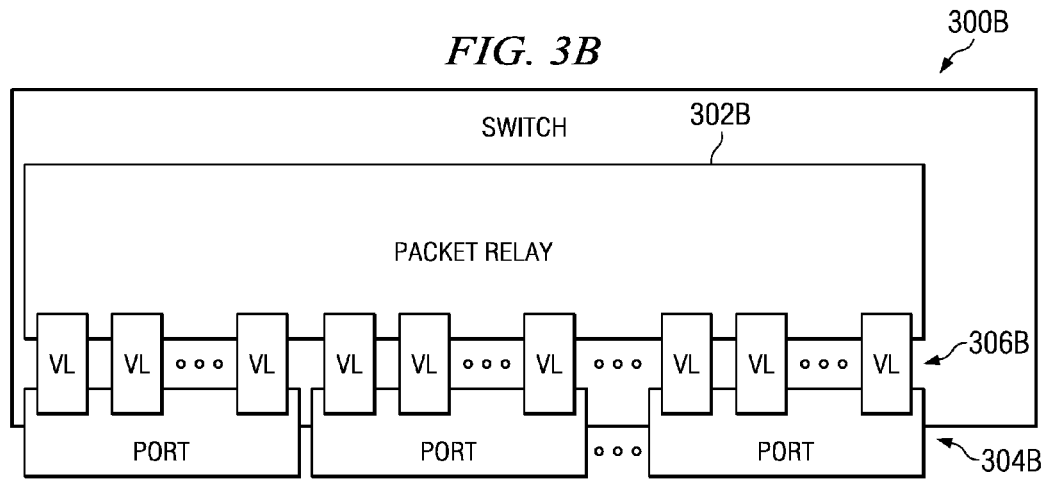
FIG. 3B is an exemplary diagram of a switch in accordance with one illustrative embodiment.

FIG. 3B depicts a switch 300B in accordance with one illustrative embodiment. Switch 300B includes a packet relay 302B in communication with a number of ports 304B through virtual lanes such as virtual lane 306B. Generally, a switch such as switch 300B can route packets from one port to any other port on the same switch.

Figure 3C:
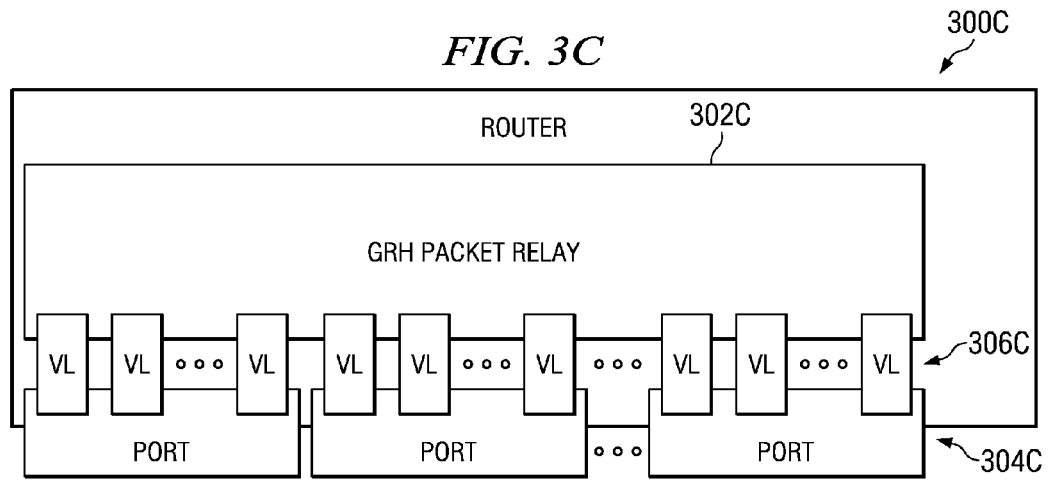
FIG. 3C is an exemplary diagram of a router in accordance with one illustrative embodiment.

Similarly, FIG. 3C depicts a router 300C according to one illustrative embodiment. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress.

Virtual lanes are employed for numerous reasons, some of which are as follows: Virtual lanes provide QoS. In one example embodiment, certain virtual lanes are reserved for high priority or isochronous traffic to provide QoS. Virtual lanes provide deadlock avoidance. Virtual lanes allow topologies that contain loops to send packets across all physical links and still be assured the loops won't cause back pressure dependencies that might result in deadlock. Virtual lanes alleviate head-of-line blocking. When a switch has no more credits available for packets that utilize a given virtual lane, packets utilizing a different virtual lane that has sufficient credits are allowed to make forward progress.

Figure 4:
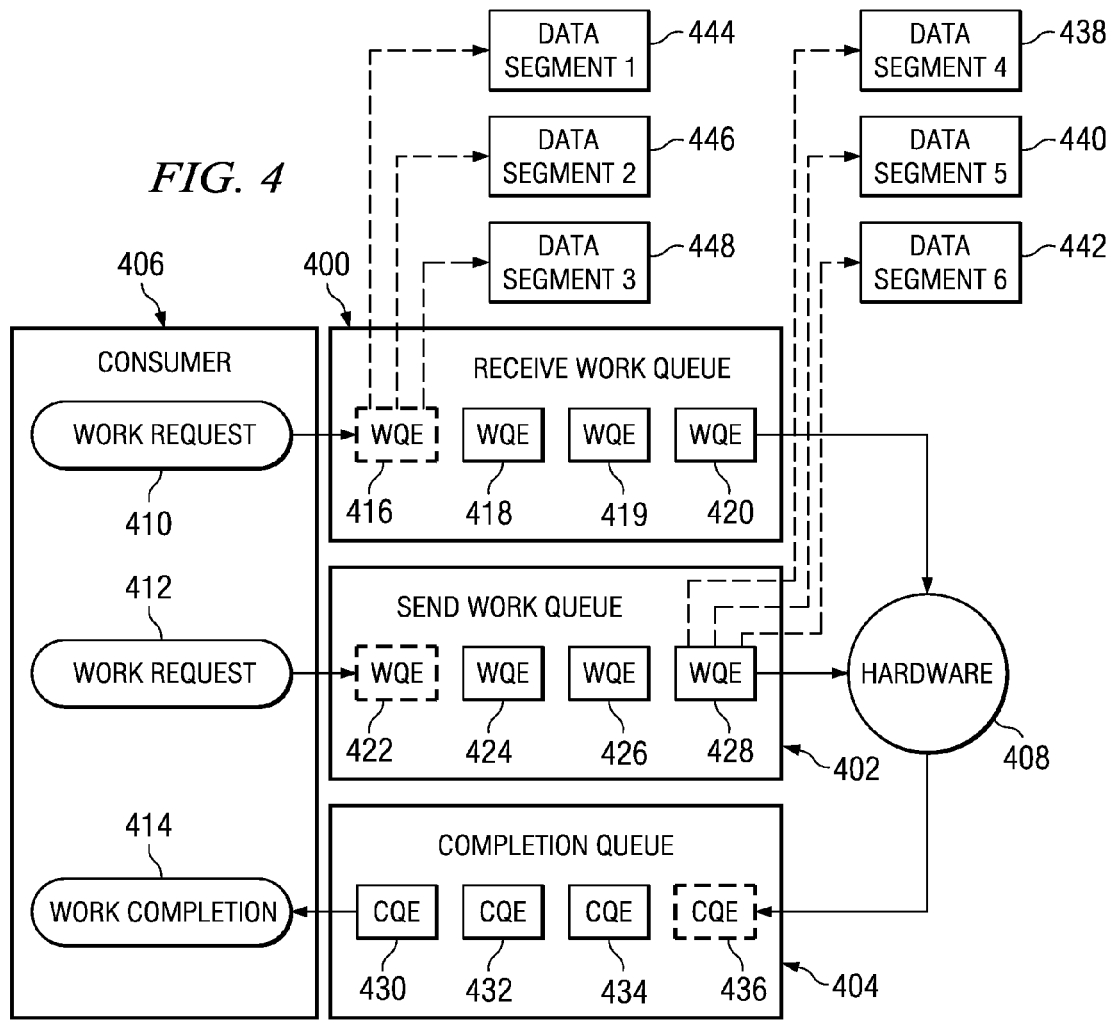
FIG. 4 is an exemplary diagram illustrating processing of work requests in accordance with one illustrative embodiment.

With reference now to FIG. 4, a diagram illustrating processing of work requests is depicted in accordance with one illustrative embodiment. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the SAN fabric. Receive work queue 400 contains work queue elements (WQEs) 416-420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430-436. Completion queue elements contain information about previously completed work queue elements. Completion queue 404 is used to create a single point of completion notification for multiple queue pairs. A completion queue element (CQE) is a data structure on a completion queue that describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 438, data segment 440, and data segment 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 444, data segment 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window with a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For inter-processor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one illustrative embodiment, a distributed computer system supports four types of transport services: reliable connection, unreliable connection, reliable datagram, and unreliable datagram connection/transport service.

Reliable and Unreliable connection services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $p^2(N-1)$ queue pairs. A process can connect a queue pair to another queue pair on the same host channel adapter.

Figure 5:
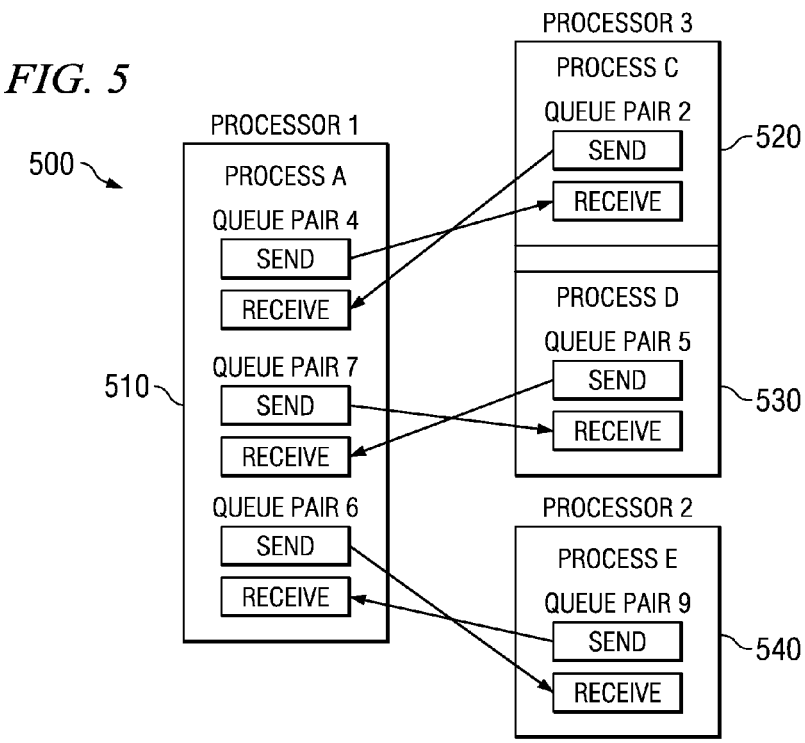
FIG. 5 is an exemplary diagram of a portion of a distributed computer system employing a reliable connection service to communicate between distributed processes in accordance with one illustrative embodiment.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process C 520 and a process D 530. Host processor node 3 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one illustrative embodiment, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive under-runs, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context (EEC). The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2(N-1)$ queue pairs on each node. By comparison, the connectionless reliable datagram service only requires P queue pairs+(N−1) EECs on each node for exactly the same communications.

Figure 6:
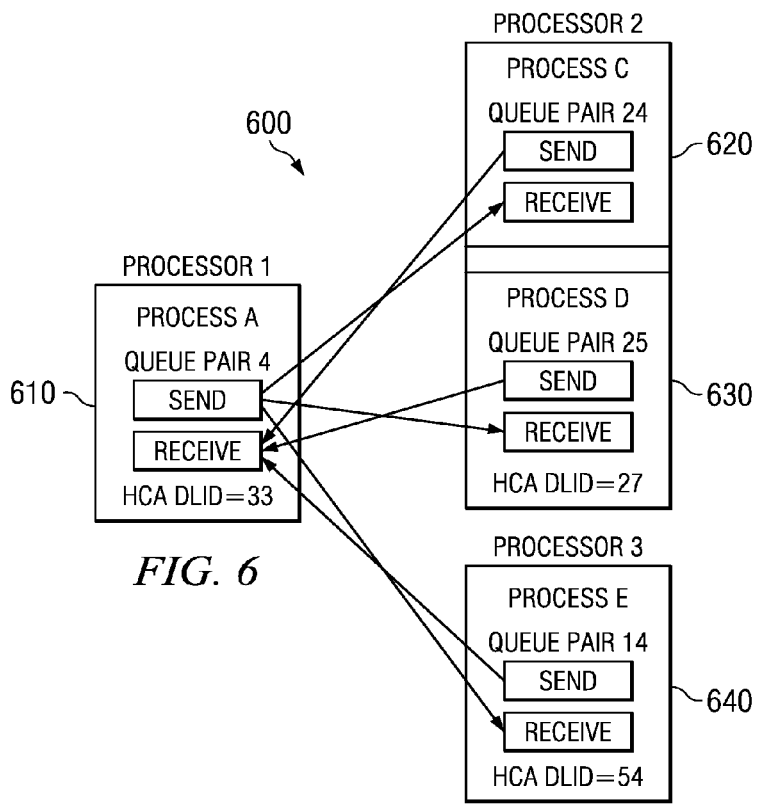
FIG. 6 is an exemplary diagram of a portion of a distributed computer system employing a reliable datagram service to communicate between distributed processes in accordance with one illustrative embodiment.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one illustrative embodiment, the reliable datagram service employs sequence numbers and acknowledgments associated with each message frame to ensure the same degree of reliability as the reliable connection service. End-to-end contexts (EECs) maintain end-to-end specific state to keep track of sequence numbers, acknowledgments, and time-out values. The end-to-end state held in the EECs is shared by all the connectionless queue pair communications between a pair of endnodes. Each endnode requires at least one EEC for every endnode it wishes to communicate with in the reliable datagram service (e.g., a given endnode requires at least N EECs to be able to have reliable datagram service with N other endnodes).

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Turning next to FIG. 7, an illustration of a data packet is depicted in accordance with one illustrative embodiment. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 702, data segment 704, and data segment 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 820. Client process B interacts with hardware channel adapter hardware 808 through queue pair 822. Queue pairs 820 and 822 are data structures that include send work queues 824 and 828 and receive work queues 826 and 830, respectively.

Process A initiates a message request by posting work queue elements to the send queue of queue pair 824. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source endnodes and consumed by destination endnodes.

With the SAN architecture described above with regard to FIGS. 1-8 in order to provide the ability to perform collective send operations that are required by high performance computing (HPC) applications, the SAN architecture provides three connection/transport service options: Reliable Connection transport service; Reliable Datagram transport service; and Unreliable Datagram transport service. The first transport service involves Reliable Connections (RCs) which utilize the reliable connection transport service previously described above. A graphical depiction of the RC transport service option for providing collective send operations is provided in FIG. 9.

Figure 9:
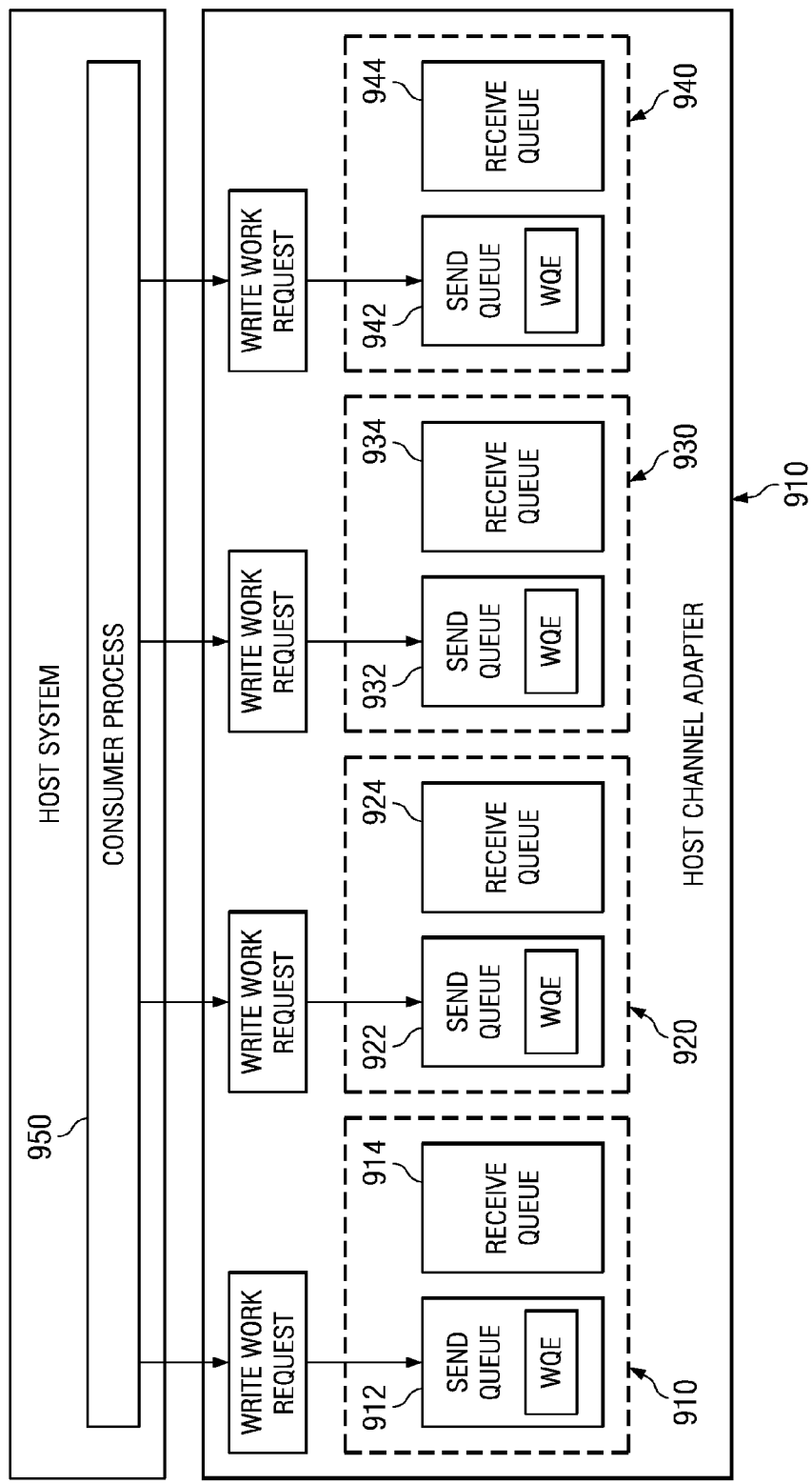
FIG. 9 is an exemplary diagram illustrating a reliable connection transport service option for providing collective send operations.

As shown in FIG. 9, the RC transport service requires that the host channel adapter 900 create a queue pair (QP) 910-940 for each end-point with which communication is to be performed. A consumer process 950 must post a write work request (WR) for each end-point which causes a work queue element (WQE) to be created in each of the send queues (SQs) 912, 922, 932, and 942 on each QP 910-940. The WQEs are then processed by the SQs 912, 922, 932, and 942 and the host channel adapter 900 in the manner previously discussed above.

While the reliable connection transport service option provides a reliable mechanism for performing collective send operations, it is not efficient. Rather, this mechanism places the burden of distributing the write work request (WR) on the consumer process 950 which must post a separate WR for each endpoint that is to receive the message that is being sent. Moreover, the host channel adapter must establish separate QPs 910-940 for each endpoint to facilitate the sending of each of the WQEs corresponding to the individual WRs submitted by the consumer process 950.

Figure 10:
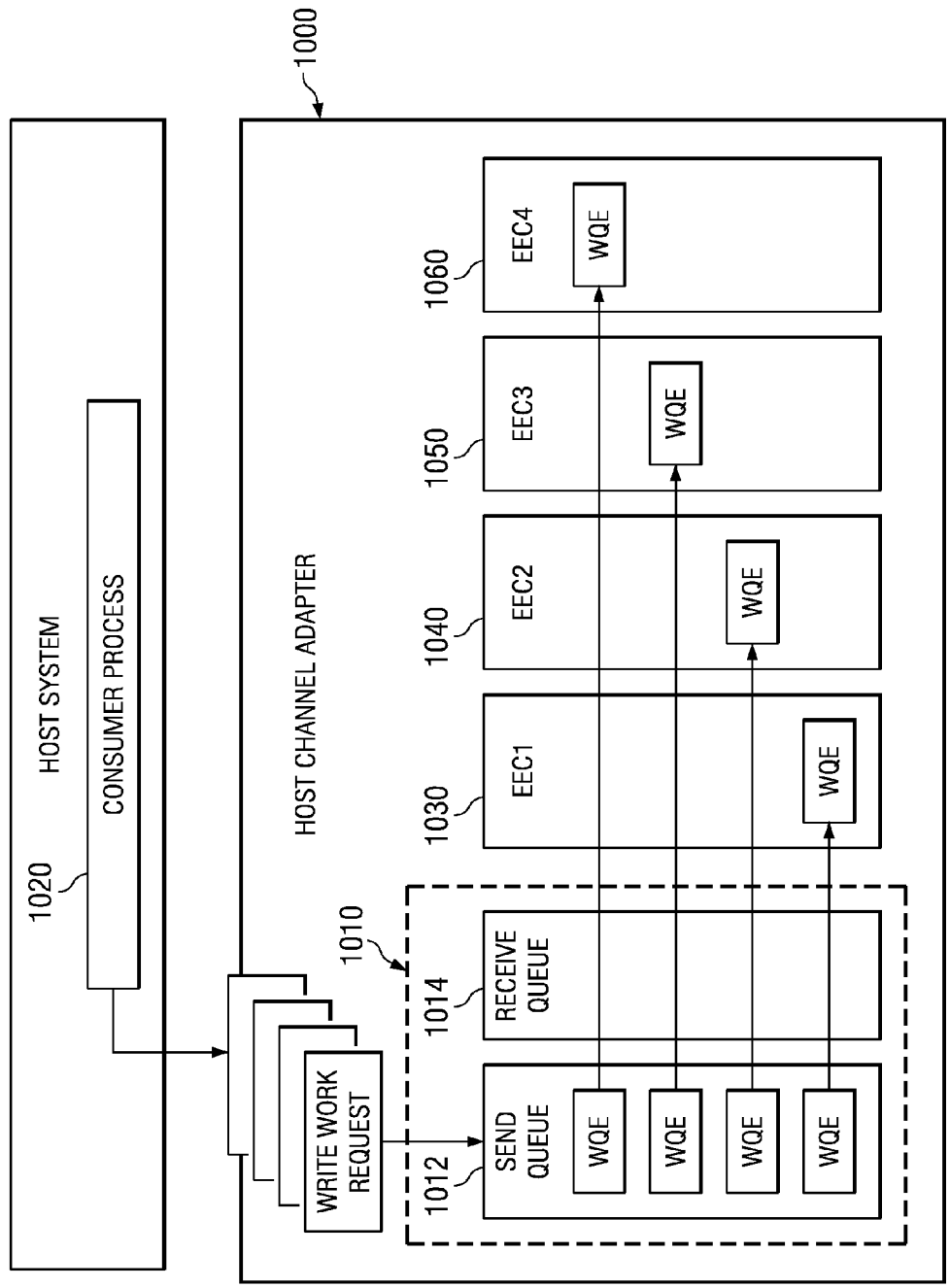
FIG. 10 is an exemplary graphical representation of a reliable datagram (RD) transport service option for collective send operations.

FIG. 10 is an exemplary graphical representation of a reliable datagram (RD) transport service option for collective send operations. As shown in FIG. 10, in the RD transport service, the host channel adapter 1000 creates a single QP 1010 which may communicate with multiple endpoints. This is made possible through the end-to-end context (EEC) mechanism provided by the RD transport service.

As shown in FIG. 10, a consumer process 1020 may post write work requests (WRs) to a send queue 1012 of a single RD QP 1010 that target any of the EECs 1030-1060 on the same host channel adapter 1000 as the RD QP 1010. Via the EECs 1030-1060, the WQEs in the send queue 1012 corresponding to the WRs are then transmitted to the endnodes corresponding to these EECs 1030-1060.

While the reliable datagram transport service may eliminate the requirement that there be a separate QP created in the host channel adapter 1000 for each endpoint, this transport service is inefficient because the consumer process 1020 must post a separate write WR for each endpoint. Thus, again the burden is placed on the consumer process 1020 to perform the collective send operation by generating and submitting separate write WRs for each endpoint that is to receive the message. Moreover, the host channel adapter 1000 must maintain a separate EEC 1030-1060 for each endpoint. Furthermore, if an endpoint has multiple QPs that need to receive the message that is the subject of the write WR, then a separate write WR must be posted to the HCA's RD QP 1010 for each QP of each endpoint that is to receive the message.

Figure 11:
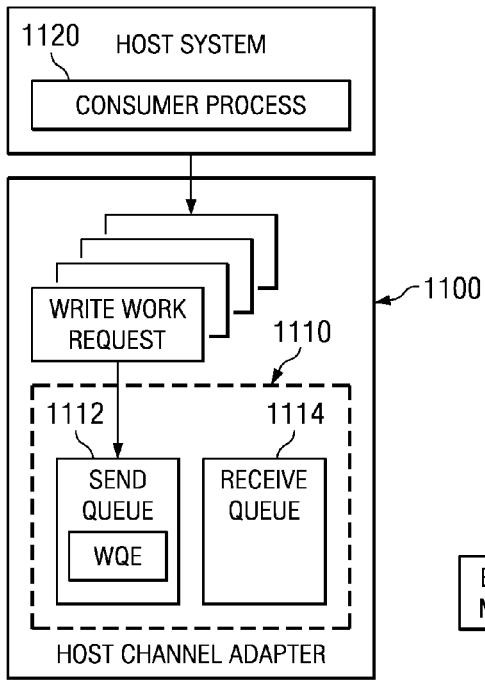
FIG. 11 is exemplary graphical representation of an unreliable datagram (UD) transport service option for performing a collective send operation.

FIG. 11 is exemplary graphical representation of an unreliable datagram (UD) transport service option for performing a collective send operation. The UD transport service is connectionless and unacknowledged. With the UD transport service, the host channel adapter 1100 need only provide a single UD QP 1110, having send queue 1112 and receive queue 1114, for performing the collective send operation. The UD transport service allows the UD QP 1110 to communicate with any other UD QP on any other node of the SAN fabric. Using this transport service, a consumer process 1120 may multicast a message by posting one WR to the send queue 1112 of the UD QP 1110. However, there is no guarantee that the WR will reach all the endpoints that it is intended to reach. There is no acknowledgement so that the consumer process 1120 cannot guarantee that the endpoints all received the message.

The mechanisms of the illustrative embodiments introduce a new collective send queue (CSQ) data structure to which collective send work requests may be posted in order to have the work requests replicated to a set of send queues registered with the CSQ. In this way, the consumer process need only post one collective write work request. The channel interface of the host channel adapter takes on the burden of determining which queue pairs (QPs) are associated with the CSQ to which the write work request is posted and of replicating the work queue elements (WQEs) corresponding to the write work request in each of the identified send queues of the associated QPs. The WQEs are then processed in a manner generally as described previously. Thus, similar to the unreliable datagram transport services, the mechanisms of the illustrative embodiments shift the burden of posting WRs to the QPs away from the consumer process while obtaining the reliability of the reliable connection transport services.

It should be noted that either a software algorithm, firmware algorithm, hardware state machine or a combination of the three can be used to perform the function of determining which queue pairs (QPs) are associated with the CSQ to which the write work request is posted. Moreover, such software, firmware, hardware state machine, or any combination of these may be used to replicate the work queue elements (WQEs) corresponding to the write work request in each of the identified send queues of the associated QPs.

FIG. 12 is an exemplary diagram illustrating a collective send operation mechanism in accordance with one illustrative embodiment. As shown in FIG. 12, a consumer process 1220 in a host system 1210 may submit a single write work request (WR) 1230 to a collective send queue data structure 1250 via the channel interface 1240 implemented by the host channel adapter 1215. The channel interface 1240 receives the WR 1230 and processes the WR 1230 to create a work queue element (WQE) 1252 in the collective send queue (CSQ) 1250. In addition, the channel interface 1240 initializes a WR counter value 1254 associated with the WQE 1252 based on the number of queue pairs (QPs) associated with the CSQ 1250 as specified in the CSQ QP Set data structure 1256 associated with the CSQ 1250.

The channel interface 1240 determines the QPs 1260-1280 which are to receive a copy of the WQE 1252 based upon the QP identifiers that are currently provided in entries of the CSQ QP Set data structure 1256. It should be noted that the QPs 1260-1280 make use of the reliable connection transport services discussed above such that acknowledgements of the processing of WQEs in the QPs are provided in the form of completion queue elements returned by the endpoints associated with the QPs. Thus, reliable delivery of messages is assured by the mechanisms of the illustrative embodiments.

The channel interface 1240 copies the WQE 1252 to the send queues 1262, 1272, and 1282, of the identified QPs 1260, 1270, and 1280. Thereafter each individual WQE in each of the send queues 1262, 1272, and 1282, are processed in a manner generally known in the art. That is, the WQEs are transmitted to the endpoints corresponding to the send queues 1262, 1272, and 1282, the endpoints process the WQEs, and return a completion queue element (CQE) that is placed in corresponding completion queues 1266, 1276, and 1286.

In addition to this normal processing, the channel interface 1240 monitors the return of CQEs in the completion queues 1266, 1276, and 1286, and decrements the WR counter 1254 for each CQE received. When the WR counter 1254 reaches a zero value, a CSQ completion queue element may be generated and posted to a CSQ completion queue 1258 to inform the consumer process 1220 that the collective send operation associated with the write WR 1230 has completed. The CSQ can be used to send one or more WRs. Additionally, the consumer may intermix posting of WRs through the CSQ with posting of WRs to one or more of the Send Queues of QPs associated with the CSQ. Moreover, once the WR counter 1254 reaches zero, it is safe for the channel interface 1240 to destroy the CSQ 1250. Thus, the channel interface 1240 may destroy the CSQ 1250 and thereby free the resources associated with the CSQ 1250 following completion of all outstanding collective send operations.

As mentioned above, the channel interface 1240 provides, among other things, three new interface operations for creating, modifying, and destroying a CSQ 1250. When a privileged consumer invokes the Create CSQ operation, the CSQ 1250 is instantiated and an initial set of one or more QPs, e.g., QPs 1260, 1270, 1280 and 1290, are associated with the CSQ 1250. In initializing the CSQ 1250, a CSQ QP Set data structure 1256 is created and populated with an identifier of the QP that is initially associated with the CSQ 1250. This CSQ QP Set data structure 1256 may be created as part of the CSQ data structure 1250 or as a separate data structure that is linked to the CSQ data structure 1250.

Thereafter, a privileged consumer may invoke the Modify CSQ operation to add additional QPs to the CSQ QP Set data structure 1256 or remove QPs from the CSQ QP Set data structure 1256. When the Modify CSQ operation is utilized to add additional QPs to the CSQ QP Set data structure 1256, the identifiers of these QPs are added to the data structure 1256. When the Modify CSQ operation is utilized to remove QPs from the CSQ QP Set data structure 1256, identified QP identifiers are removed from the data structure 1256. These modifications alter the total number of QPs specified in the CSQ QP Set data structure 1256 and thus, subsequent postings of WQEs to the CSQ may have WR counter values that are different from previous WR counter values due to the change in total number of QPs in the CSQ QP Set data structure 1256.

When the CSQ 1250 is no longer needed for collective send operations, a privileged consumer may invoke a Destroy CSQ operation. The Destroy CSQ operation is responsible for removing the CSQ 1250 and freeing any resources allocated to the CSQ 1250.

Thus, the channel interface 1240 uses the Create CSQ operation to instantiate the CSQ 1250 and initially populates its associated CSQ QP Set data structure 1256. The channel interface 1240 uses the Modify CSQ operation to add/remove QPs. Finally, the channel interface 1240 uses the Destroy CSQ operation to remove the CSQ and free its resources when it is no longer needed.

The above illustrative embodiment shown in FIG. 12 makes use of a WR counter 1254 to determine when the collective send operation associated with the WQE 1252 is complete. As mentioned above, the WR counter 1254 is initially set to a value equal to the number of QPs registered or identified in the CSQ QP Set data structure 1256 and is decremented with each received completion queue entry in response to the processing of the WQE at each of the endpoints. It should be appreciated that in an alternative approach, the WR counter 1254 may be initially set to an initial value, such as zero, and incremented until it reaches a value that is equal to the number of QPs identified in the CSQ QP Set data structure 1256 at the time that the WQE 1252 was created in the CSQ 1250.

Figure 13:
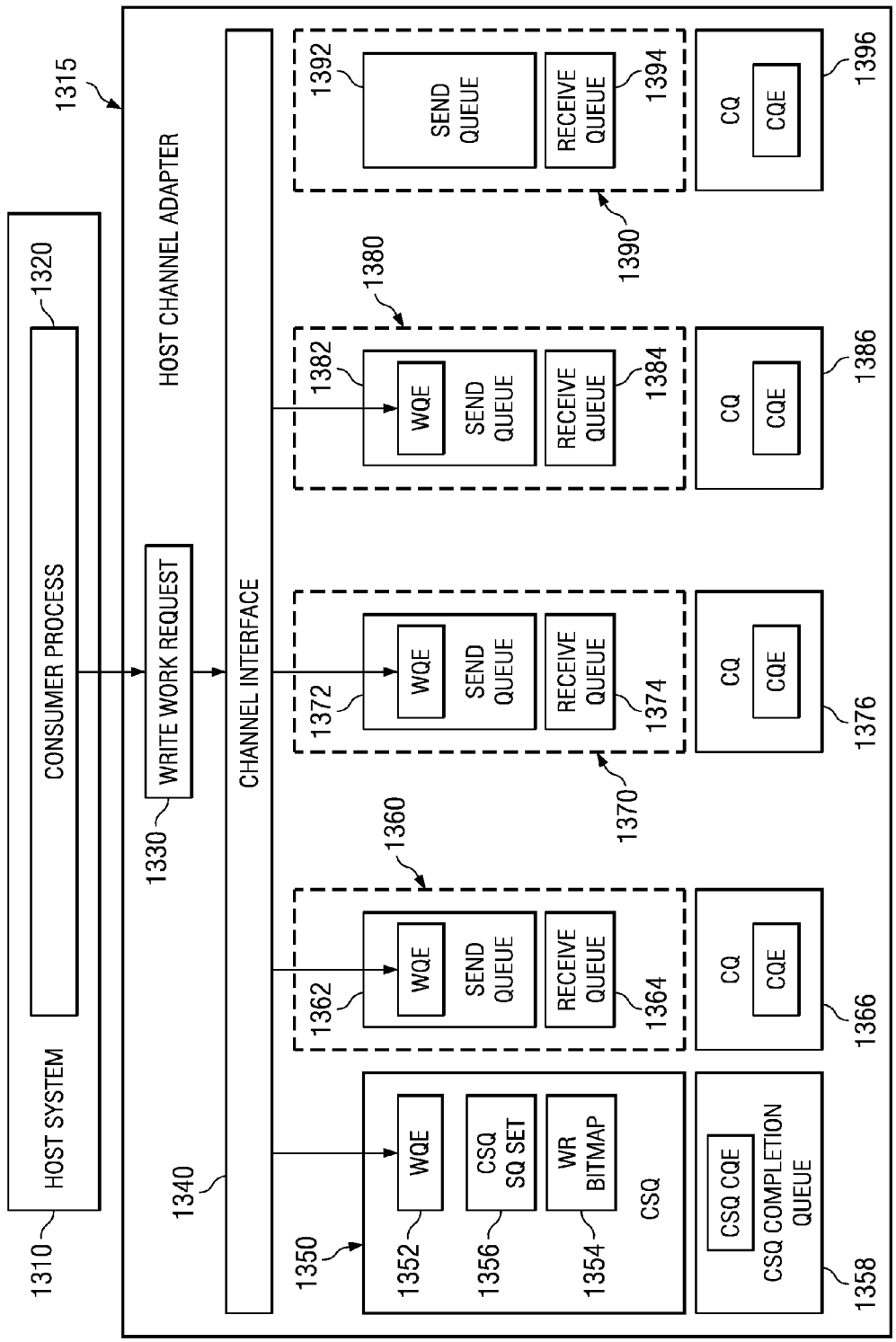
FIG. 13 illustrates an alternative illustrative embodiment in which a bitmap is utilized to keep track of which WQEs have completed processing and which have not.

In another alternative illustrative embodiment, rather than using a WR counter 1254 to monitor the progress of the collective send operation, a bit map may be used. FIG. 13 illustrates an alternative illustrative embodiment in which a bitmap is utilized to keep track of which WQEs have completed processing and which have not. The elements shown in FIG. 13 are essentially the same as that of FIG. 12 with the exception that a WR bitmap 1354 is provided instead of the WR counter and the operation of the channel interface 1340 in monitoring the progress of the collective send operation is different.

With this alternative illustrative embodiment, when the channel interface 1340 generates the WQE 1352, it initializes a WR bitmap 1354 that contains a bit for each of the QPs registered with or identified in the CSQ QP set data structure 1356. Thus, each QP identifier in the CSQ QP set data structure is mapped to a particular bit in the WR bitmap 1354 and thus, based on the setting of the bits in the WR bitmap 1354, it can be determined which QP has not received a completion queue element back from the endpoint.

As the completion queues associated with the QPs 1360-1390 receive completion queue elements for the WQEs copied to them by the channel interface 1340 from the CSQ 1350, the channel interface 1340 monitors these completion queues 1366, 1376, 1386 and 1396. For each CQE received in the completion queues 1366, 1376, and 1386 associated with the QPs 1360, 1370, and 1380 associated with the CSQ 1350, a corresponding bit in the WR bitmap 1354 is set. When all of the bits in the WR bitmap 1354 are set, the collective send operation is completed and the channel interface 1340 may post a CSQ completion queue element to the CSQ completion queue 1358 to thereby inform the consumer process 1320 of the host system 1310 that the collective send operation associated with the write WR 1330 has completed. Moreover, the CSQ 1350 may be removed using the Destroy CSQ operation discussed above.

An added benefit of using a WR bitmap 1354 rather than a WR counter is that the source of an error may be identified using the WR bitmap 1354. For example, if the original write WR 1330 times-out, i.e. it is not completed within a predetermined period of time, an error message may be returned to the consumer process 1320 that includes the status of the WR bitmap 1354. This error message may include, for example, an identifier of the QPs that did not receive a completion queue element in their associated completion queues within the predetermined period of time. From this, it can be determined which endpoints were not able to process the WQE 1352 corresponding to the write WR 1330. In other words, if the WR bitmap 1354 shows that the second bit is not set, and that bit corresponds to QP 1370, then it can be determined that the endpoint associated with QP 1370 has caused the error in processing of the write WR 1330. From this, appropriate corrective action may be taken, such as resubmitting the write WR 1330, sending an alert to a system monitor, or the like.

Thus, the illustrative embodiments provide a mechanism by which collective send operations may be performed using a single posting of a collective write work request by a consumer process that is then replicated automatically by a channel interface of a channel adapter to send queues of queue pairs associated with endpoints to which the write work request is to be directed. In this way, the burden of generating multiple work requests in the consumer process is eliminated. Moreover, reliability of delivery of the work request to the endpoints is made possible by using reliable connection transport services of the send queues of the queue pairs.

Figure 14:
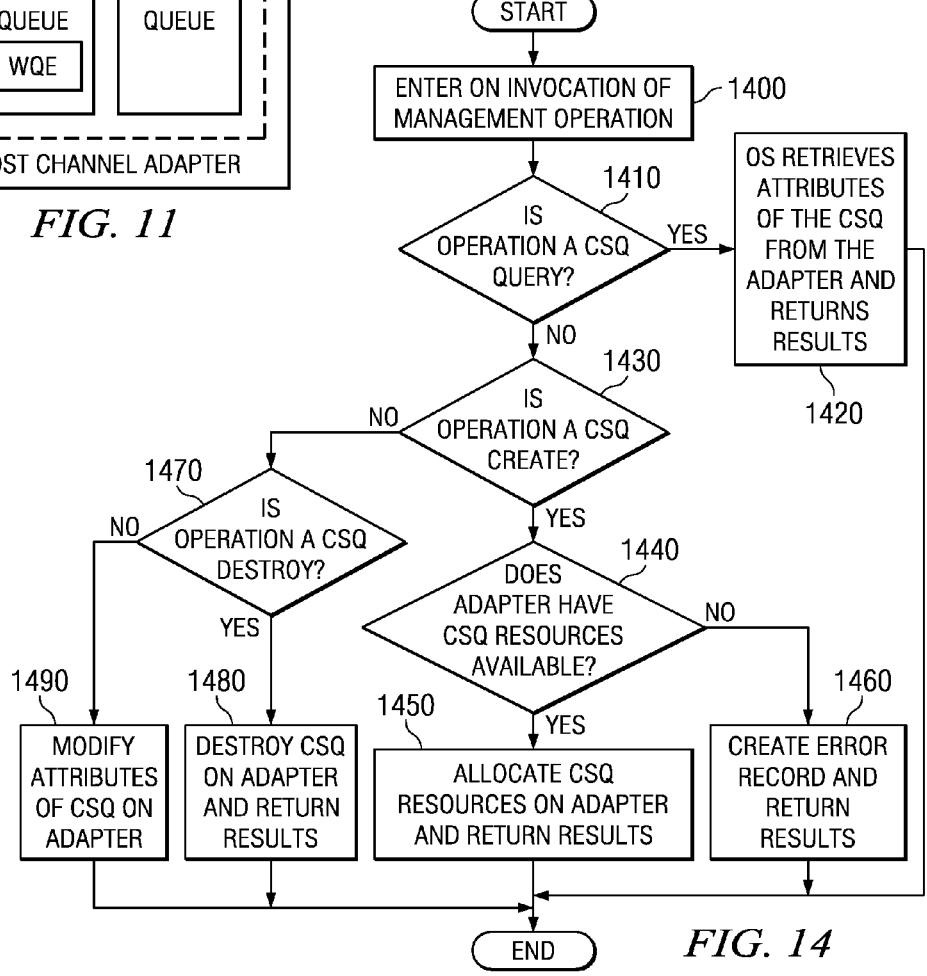
FIG. 14 is a flowchart outlining an exemplary operation for handling an invocation of a CSQ management operation in accordance with one illustrative embodiment.
Figure 15:
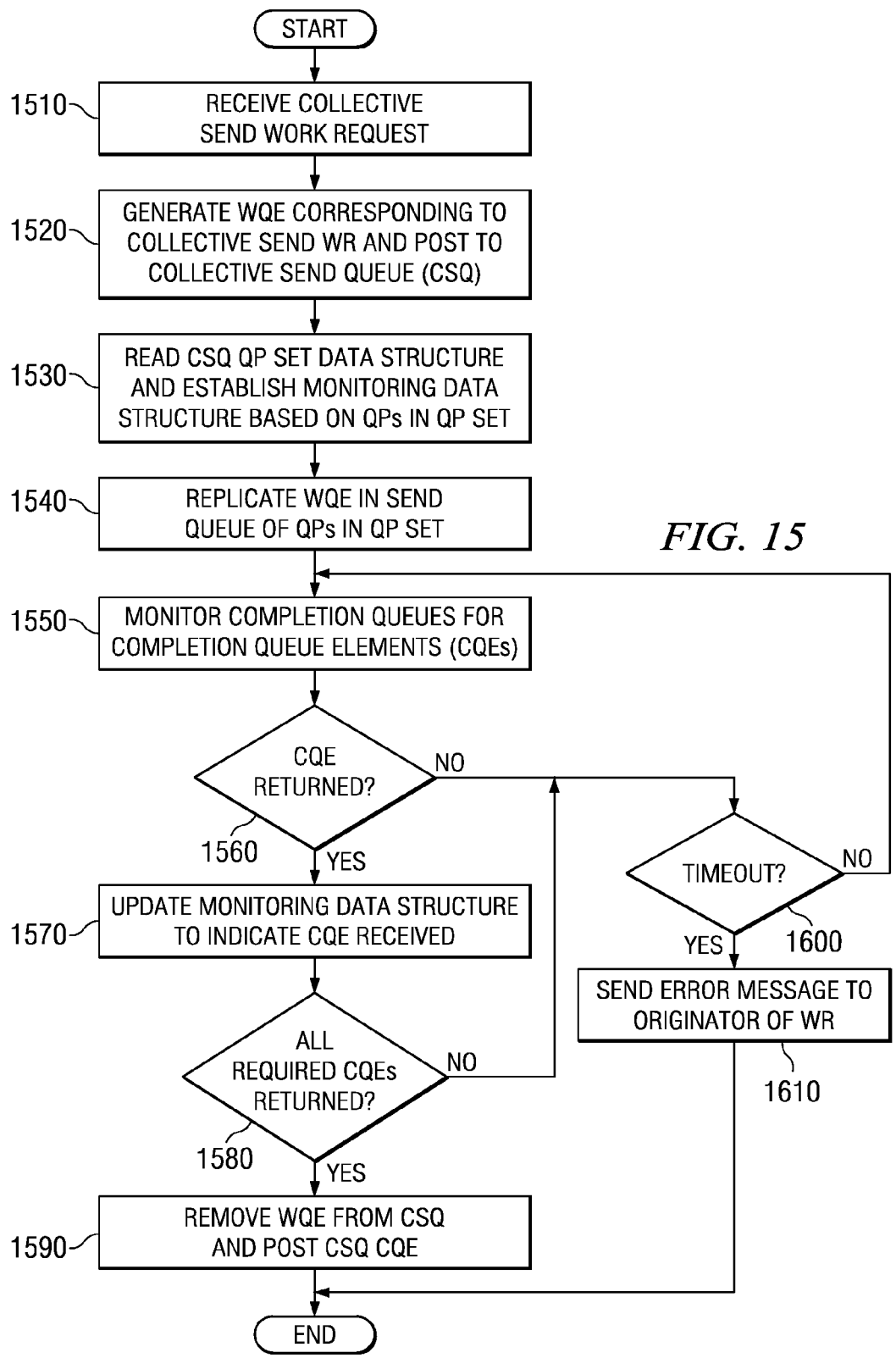
FIG. 15 is a flowchart outlining an exemplary operation for performing a collective send operation in accordance with one illustrative embodiment.

FIGS. 14 and 15 are exemplary diagrams illustrating flowcharts that outline exemplary operations of the illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks. In addition, the flowcharts described in FIGS. 14-15 may be implemented as a finite state machine that is completely instantiated in hardware. Moreover, the flowcharts described in FIGS. 14-15 may be implemented as a mix of computer program instructions and a finite state machine.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 14 is a flowchart outlining an exemplary operation for handling an invocation of a CSQ create, modify, query or destroy operation in accordance with one illustrative embodiment. In an exemplary embodiment of the present invention, the operations outlined in FIG. 14 are performed by a system image or operating system in response to an invocation of a management operation. While the exemplary embodiments have these operations being performed in a system image or operating system, the present invention is not limited to such. Rather, for example, the operations may be performed in a service partition, a hypervisor, or the like.

As shown in FIG. 14, the operation starts with an invocation of a management operation (step 1400). This invocation may be performed, for example, by way of a user management interface, an automated script/workflow, or the like. The invocation may be made via an application instance, the system image, or the like. This user management interface is invoked for management operations like CSQ create, modify, query or destroy.

A determination is made as to whether the operation is a CSQ query operation (step 1410). If the operation is a CSQ query operation, then the system image/operating system retrieves the attributes of the CSQ from the physical I/O adapter and returns the results to the consumer, e.g., system image or application instance, that invoked the management operation (step 1420). This operation is used to obtain CSQ attributes, such as the number of QPs associated with the CSQ, the list of QPs associated with the CSQ and the state of the CSQ.

If the operation is not a CSQ query operation, then a determination is made as to whether the operation is a CSQ create operation (step 1430). If the operation is a CSQ create operation, a determination is made as to whether the physical I/O adapter has CSQ resources available to allocate to the consumer invoking the management operation (step 1440). For example, as discussed above, each CSQ may have state information maintained in the adapter. This state information may limit the number of CSQ resources available by the adapter for allocation. Thus, the physical I/O adapter may determine that sufficient CSQ resources are not available for allocation to the consumer invoking the operation.

If there are sufficient CSQ resources available to allocate, then these CSQ resources are allocated on the physical I/O adapter and the physical I/O adapter returns the results of this allocation to the invoking consumer (step 1450). If there are not sufficient CSQ resources available to allocate, then an error record may be generated and returned to the consumer invoking the operation (step 1460).

If the operation is not a CSQ create operation (step 1430), then a determination is made as to whether the operation is a CSQ destroy operation, also referred to herein as a "delete" or "de-allocation" operation (step 1470). If the operation is a CSQ destroy operation, then the CSQ resource is destroyed on the physical I/O adapter and the results of the operation are returned to the consumer invoking the management operation (step 1480). If the operation is not a CSQ destroy operation, then the operation is a CSQ modify operation and the attributes of the designated CSQ resource are modified on the physical I/O adapter (step 1490). The operation then terminates.

FIG. 15 is a flowchart outlining an exemplary operation for performing a collective send operation in accordance with one illustrative embodiment As shown in FIG. 15, the operation starts with the channel interface of a channel adapter receiving a collective send work request (step 1510). The channel interface generates a work queue element corresponding to the collective send work request and posts the work queue element in a collective send queue data structure of the host channel adapter (step 1520). The channel interface reads the collective send queue QP set data structure and establishes a monitoring data structure based on the QPs identified in the collective send queue QP set data structure (step 1530). This monitoring data structure may be, for example, a counter, a bitmap, or another data structure that may be used to monitor the completion status of the collective send operation.

The channel interface replicates the work queue element in the collective send work request to the send queues of the QPs identified in the collective send queue QP set data structure (step 1540). The channel interface then monitors the completion queues associated with the QPs to determine if a completion queue element corresponding to the copies of the work queue element are returned (step 1550). If a completion queue element is returned (step 1560), then the monitoring data structure is updated to indicate that the completion queue element was received (step 1570).

The channel interface then determines if all required completion queue elements have been received (step 1580). If not, the operation continues to step 1600. If all required completion queue elements have been received, then the work queue element in the collective send queue is removed and a corresponding collective send queue completion queue element is posted to an associated collective send queue completion queue (step 1590). The operation then terminates.

If a completion queue element is not returned within a predetermined period of time (step 1560) or if all required completion queue elements have not been received (step 1580), the channel interface determines if a timeout of the original collective send operation request has occurred (step 1600). If a timeout of the original collective send operation request has occurred, an error message may be returned to the originator of the collective send operation request (step 1610). This error message may specify which QPs did not return completion queue elements and thereby, identify the endpoints that are the cause of the error so that corrective action may be taken. If a timeout has not occurred, the operation returns to step 1550.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing collective send operations, comprising:
    creating, in the data processing system, a collective send queue data structure in a host channel adapter of the data processing system, the collective send queue data structure having a plurality of associated queue pairs for communicating with a plurality of endpoint devices;
    receiving a single work request, from a consumer process running in the data processing system, specifying a collective send operation;
    posting a queue element corresponding to the work request in the collective send queue data structure; and
    automatically replicating the queue element in send queues of the plurality of queue pairs associated with the collective send queue data structure, wherein the send queues process the replicated queue element to thereby perform the collective send operation.

2. The method of claim 1, further comprising:
    creating a work request counter; and
    modifying a value of the work request counter in response to receiving completion notifications from the plurality of queue pairs associated with the collective send queue data structure.

3. The method of claim 2, wherein the work request counter value is initially set to a value corresponding to a number of queue pairs associated with the collective send queue data structure, and wherein modifying the value of the work request counter comprises decrementing the work request counter value in response to receiving a completion notification from a queue pair in the plurality of queue pairs associated with the collective send queue data structure.

4. The method of claim 3, wherein when the work request counter value equals zero, a work request completion message is posted to a completion queue.

5. The method of claim 2, wherein:
    the work request counter value is initially set to zero,
    modifying a value of the work request counter comprises incrementing the work request counter value in response to receiving completion notifications from the plurality of queue pairs associated with the collective send queue data structure, and
    when the work request counter value equals a number of queue pairs associated with the collective send queue data structure, a work request completion message is posted to a completion queue.

6. The method of claim 1, wherein the method is implemented by a channel interface of a channel adapter.

7. The method of claim 1, wherein the method is implemented in a hardware adapter associated with a host node in a system area network.

8. The method of claim 1, wherein the collective send queue (CSQ) is created by a privileged consumer process invoking a Create CSQ interface operation of a channel interface implemented by a hardware channel adapter.

9. The method of claim 1, wherein the plurality of queue pairs associated with the collective send queue (CSQ) are associated with the CSQ by a privileged consumer process invoking a Modify CSQ interface operation of a channel interface implemented by a hardware channel adapter to thereby add a queue pair to a queue pair list data structure associated with the CSQ.

10. The method of claim 4, wherein, when the work request value equals zero, the collective send queue (CSQ) is destroyed, and wherein the CSQ is destroyed by a privileged consumer process invoking a Destroy CSQ interface operation of a channel interface implemented by a hardware channel adapter.

11. The method of claim 1, further comprising:
    generating a work request bit map, wherein the work request bit map has a bit associated with each queue pair of the plurality of queue pairs associated with the collective send queue;
    monitoring a plurality of completion queues associated with the plurality of queue pairs for completion queue elements associated with the replicated queue elements; and
    setting bits in the work request bit map in response to posting of completion queue elements to the plurality of completion queues.

12. The method of claim 11, further comprising:
    determining if all of the bits in the work request bit map are set; and
    posting a work request completion message to a completion queue in response to all of the bits in the work request bit map being set.

13. The method of claim 11, further comprising:
    determining if a timeout condition associated with the single work request occurs; and
    returning an error message containing the work request bit map to the consumer process in response to the timeout condition occurring.

14. The method of claim 12, further comprising:
    determining which endpoints were not able to process the replicated queue elements corresponding to the single work request based on bit settings in the work request bit map.

15. A computer program product comprising a computer useable storage medium having a computer readable program stored thereon, wherein the computer readable program, when executed on a computing device, causes the computing device to:

create a collective send queue data structure in a host channel adapter of the computing device, the collective send queue data structure having a plurality of associated queue pairs for communicating with a plurality of endpoint devices;

receive a single work request, from a consumer process running in a data processing system, specifying a collective send operation;

post a queue element corresponding to the work request in the collective send queue data structure; and automatically replicate the queue element in send queues of the plurality of queue pairs associated with the collective send queue data structure, wherein the send queues process the replicated queue element to thereby perform the collective send operation.

16. The computer program product of claim 15, wherein the computer readable program further causes the computing device to:

create a work request counter;

modify a value of the work request counter in response to receiving completion notifications from the plurality of queue pairs associated with the collective send queue data structure; and posting a work request completion message to a completion queue associated with the collective send queue in response to the work request counter achieving a predetermined value.

17. The computer program product of claim 15, wherein the computer readable program further causes the computing device to:

generate a work request bit map, wherein the work request bit map has a bit associated with each queue pair of the plurality of queue pairs associated with the collective send queue;

monitor a plurality of completion queues associated with the plurality of queue pairs for completion queue elements associated with the replicated queue elements; and set bits in the work request bit map in response to posting of completion queue elements to the plurality of completion queues.

18. The computer program product of claim 17, wherein the computer readable program further causes the computing device to:

determine if all of the bits in the work request bit map are set; and post a work request completion message to a completion queue in response to all of the bits in the work request bit map being set.

19. The computer program product of claim 17, wherein the computer readable program further causes the computing device to:

determine if a timeout condition associated with the single work request occurs; and return an error message containing the work request bit map to the consumer process in response to the timeout condition occurring, wherein one or more endpoints that are not able to process the replicated queue elements corresponding to the single work request are determined based on bit settings in the work request bit map.

20. A system, comprising:

a host node; and a channel adapter coupled to the host node, wherein the channel adapter:

creates a collective send queue data structure in the channel adapter, the collective send queue data structure having a plurality of associated queue pairs for communicating with a plurality of endpoint devices;

receives a single work request, from a consumer process running in the host node, specifying a collective send operation;

posts a queue element corresponding to the work request in the collective send queue data structure; and automatically replicates the queue element in send queues of the plurality of queue pairs associated with the collective send queue data structure, wherein the send queues process the replicated queue element to thereby perform the collective send operation.

* * * * *